US007689304B2

(12) United States Patent
Sasaki

(10) Patent No.: US 7,689,304 B2

(45) Date of Patent: Mar. 30, 2010

(54) AUDIO PLAYBACK APPARATUS, AUDIO PLAYBACK METHOD, AND PROGRAM

(75) Inventor: Yoshio Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1074 days.

(21) Appl. No.: 10/773,477

(22) Filed: Feb. 6, 2004

(65) Prior Publication Data

US 2004/0187670 A1 Sep. 30, 2004

(30) Foreign Application Priority Data

Feb. 7, 2003 (JP) .............................. 2003-030679

(51) Int. Cl.
*G06F 17/00* (2006.01)
*G11B 21/08* (2006.01)

(52) U.S. Cl. ........................................ 700/94; 369/30.08

(58) Field of Classification Search ... 369/30.08–30.09; 700/94
See application file for complete search history.

(56) References Cited

U.S. PATENT DOCUMENTS 4,667,314 A * 5/1987 Iwashima .............. 369/178.01
5,726,960 A * 3/1998 Yoshida et al. ............. 369/30.3
5,798,921 A * 8/1998 Johnson et al. ................ 700/94
6,031,797 A * 2/2000 Van Ryzin et al. ....... 369/30.28
6,707,768 B2 * 3/2004 Schilling et al. ......... 369/30.08
6,928,433 B2 * 8/2005 Goodman et al. .............. 707/4
7,043,477 B2 * 5/2006 Mercer et al. .................. 707/7
7,599,610 B2 * 10/2009 Benyamin et al. ........... 386/126
2002/0031071 A1 * 3/2002 Han et al. ................ 369/53.22
2002/0093884 A1 * 7/2002 Hochendoner ........... 369/30.05
2002/0103796 A1 * 8/2002 Hartley .......................... 707/4
2003/0058781 A1 * 3/2003 Millikan et al. ............. 369/272
2003/0137904 A1 * 7/2003 Shibata ..................... 369/30.09
2003/0236582 A1 * 12/2003 Zamir et al. .................. 700/94

FOREIGN PATENT DOCUMENTS

JP 2002-269958 9/2002

* cited by examiner

*Primary Examiner*—Vivian Chin
*Assistant Examiner*—Joseph Saunders, Jr.
(74) *Attorney, Agent, or Firm*—Finnegan, Henderson, Farabow, Garrett & Dunner, L.L.P.

(57) ABSTRACT

The present invention is intended to provide an audio playback apparatus which is capable of randomly reproducing music on an album basis or a folder basis. In a sound source in which a plurality of music files are hierarchically recorded, a unit of music file groups in each of which music files are reproduced in a batch is specified, music file groups are randomly selected in the specified unit, and all music files included in each of the selected music file groups are reproduced.

16 Claims, 8 Drawing Sheets

AUDIO PLAYBACK APPARATUS, AUDIO PLAYBACK METHOD, AND PROGRAM

BACKGROUND OF THE INVENTION

The present invention relates generally to an audio playback apparatus and, more particularly, to an audio playback apparatus which is capable of randomly reproducing music.

Related-art audio playback apparatuses are configured such that, when reproducing music recorded to recording media such as CD (Compact Disk) and MD (Mini Disk), the recorded music may be reproduced in a random manner. Especially, with in-vehicle audio playback systems, random playback is often used for the safety reason that an operation for music selection during driving may endanger driving. With such random playback, although a range of music to be reproduced may be specified in a limited manner, the music to be randomly selected is limited to only one piece of music at a time.

Technologies are known in which, when randomly selecting music files to be reproduced, one of the areas (folders) each directly storing music files is randomly selected, then one of the music files is selectively reproduced, and, after the reproduction, folder selection is executed again to randomly selectively reproduce one of the music files (for example, refer to patent document 1).

[Patent Document 1]

Japanese Patent Laid-open No. 2002-269958

However, with the related-art playback apparatuses for reproducing small-size recording media such as CD and MD, it is enough for the random playback of one piece of music at a time; with recently-developed audio playback apparatuses which use large-size recording media such as DVD (Digital Versatile Disc) and hard disk and therefore may record stacks of music albums, needs are increasing for the random playback of music on an album or folder basis in addition to the random playback of one piece of music at a time.

Especially, with in-vehicle audio playback apparatuses, random playback is often used because the acts during driving of selecting one album from among many and selecting desired pieces of music from the selected album pose a danger to driving; with the related-art random playback in which playback is performed in unit of one piece of music, if a desired piece of music has been reproduced and the user wants to listen to all pieces of music in the album in which the piece of music just reproduced is contained, the user must executes cumbersome operations of clearing the random playback mode and, after listening to that album, entering the random playback mode again. Thus, although the capabilities of random reproduction on an album or a folder basis provide very high user-friendliness, none of the related-art audio playback apparatuses have these capabilities to the knowledge of the applicant thereof.

It should be noted that the technology disclosed in the above-mentioned patent document 1 is associated with a random playback apparatus which provides the random playback in unit of one piece of music by repeating random playback operations by executing the selection on a folder basis as first selection means and then selecting one of the music files contained in the selected folder file as second selection means, thereby minimizing the continuous selection of music files in the same folder. Also, the above-mentioned patent document does not disclose an effective technology which supports the random playback in unit of an album or a folder.

It is therefore an object of the present invention to provide an audio playback apparatus capable of performing random playback in unit of an album or a folder.

SUMMARY OF THE INVENTION

In carrying out the invention and according to one aspect thereof, there is provided an audio playback apparatus characterized by, in a sound source in which a plurality of music files are recorded in a hierarchical manner, the specification of a unit of a music file group in which the plurality of music files recorded in the sound source are reproduced in a batch; the random selection of the music file group in the unit specified by the playback unit specification means; and the playback of all music files included in the music file group selected by the music file group selection means. The above-mentioned sound source records a folder, an album formed in the folder, and a music file formed in the album in a hierarchical manner and, as a unit of music file groups which are reproduced in a batch, a music file, an album, or a folder may be specified. Especially, if the folder is specified as the unit of music file groups which are reproduced in a batch, albums may be randomly selected from the selected music file group to reproduce the music files for each selected album.

Also, the above-mentioned audio playback apparatus is characterized by the specification of the selected area of music file groups. Especially, for the sound source hierarchically formed with folders, albums formed in each folder, and music files formed in each album, the album, the folder, or all areas of the sound source may be specified as a music file group selected area.

Further, in the playback of music files contained in a selected music file group, these files may be sequentially reproduced in the order of their recording to the sound source. Also, these music files may be randomly reproduced.

In carrying out the invention and according to another aspect thereof, there is provided an audio playback characterized by that music files are recorded to the sound source for each album which is the minimum unit in a set of music files, albums to be reproduced are randomly selected from the sound source, and music files are reproduced on an album basis.

In carrying out the invention and according to still another aspect thereof, there is provided an audio playback apparatus characterized by that music files are recorded to the sound source for each folder storing albums providing the minimum unit in a set of music files, a folder to be reproduced is randomly selected from the sound source, and music files are reproduced on a folder basis.

In carrying out the invention and according to yet another aspect thereof, there is provided an audio playback method comprising the steps of: specifying, in a sound source in which a plurality of music files are recorded in a hierarchical manner, a unit of a music file group in which the plurality of music files recorded in the sound source are reproduced in a batch; randomly selecting the music file group in the unit specified by the playback unit specification step; and reproducing all music files included in the music file group selected by the music file group selection step.

The above-mentioned audio playback method further comprises a selected area specification step for specifying an selected area of the music file group. The above-mentioned playback step randomly reproduces the music files included in the selected music file group. If, from the sound source recording a folder, an album formed in the folder, and a music file formed in the album in a hierarchical manner, the folder is specified in the playback unit specification step, randomly selecting the album from the music file group selected by the music file group selection step; wherein the playback step reproduces music files for each selected album.

In carrying out the invention and according to a different aspect thereof, there is provided a program for causing a computer to execute the functions of: specifying, in a sound source in which a plurality of music files are recorded in a hierarchical manner, a unit of a music file group in which the plurality of music files recorded in the sound source are reproduced in a batch; randomly selecting the music file group in the unit specified by the playback unit specification function; and reproducing all music files included in the music file group selected by the music file group selection function.

The above-mentioned program further comprising the function of specifying the selected area of music file groups. In addition, if, from the sound source recording a folder, an album formed in the folder, and a music file formed in the album in a hierarchical manner, the folder is specified by the playback unit specification function, a function of randomly selecting the album from the music file group selected by the music file group selection function; wherein the playback function reproduces music files for each selected album.

BRIEF DESCRIPTION OF THE DRAWINGS

These and other objects of the invention will be seen by reference to the description, taken in connection with the accompanying drawing, in which.

DETAILED DESCRIPTION OF THE PREFERRED EMBODIMENTS

Figure 1:
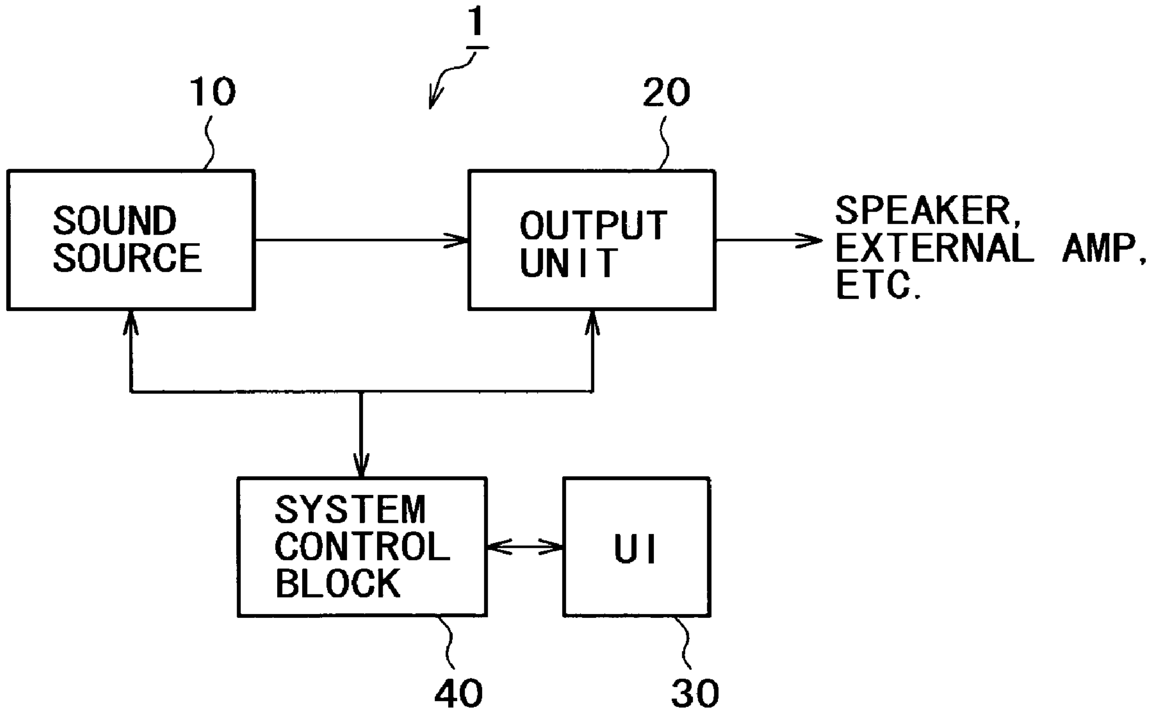
FIG. 1 is a block diagram illustrating a configuration of an audio playback apparatus of the invention.

This invention will be described in further detail by way of example with reference to the accompanying drawings. Now, referring to FIG. 1, there is shown a block diagram illustrating a configuration of an audio playback apparatus as one embodiment of the present invention. An audio playback apparatus 1 has a sound source 10 comprised of a hard disk or a DVD which is large in storage capacity for storing large amounts of data, an output unit 20 for outputting signals supplied from the sound source 10 to the outside, a user interface (UI) 30 through which the user understands the operation status of the audio playback apparatus 1 and operates the audio playback apparatus 1, and a system control block 40 for controlling the audio playback apparatus 1 in its entirety.

Figure 2:
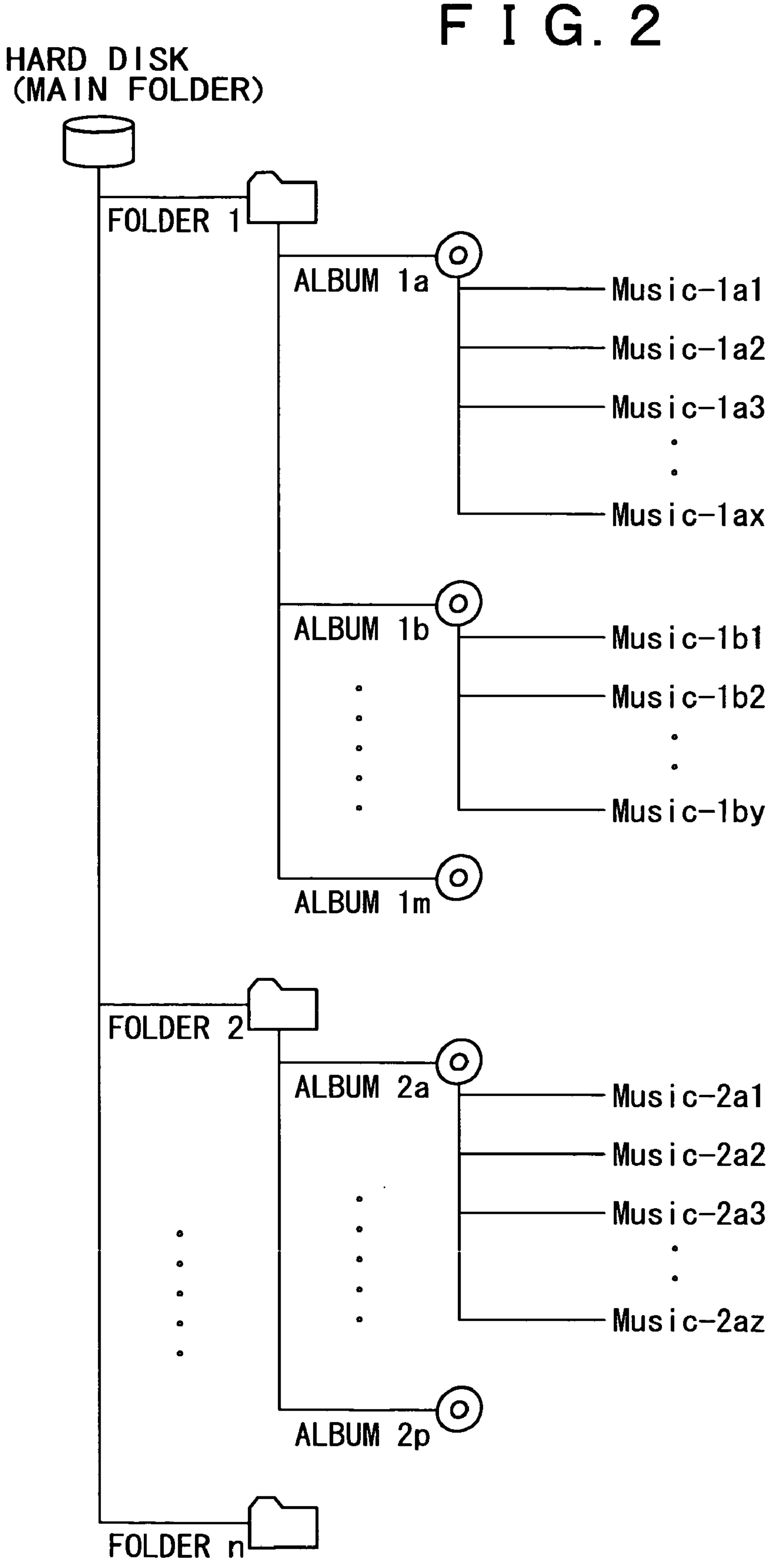
FIG. 2 is a schematic diagram illustrating a configuration inside a sound source in which music files are recorded in a hierarchical manner.

The sound source 10 records music files as the sound source in a hierarchical structure. FIG. 2 illustrates an internal structure of the sound source 10 which records music files in a hierarchical structure. As shown in FIG. 2, a plurality of folders are formed in the sound source 10, one or more albums being formed in each folder. An album herein denotes a set of music files in which one or more pieces of music (music files) are collected; generally, one platter of CD is called an album. A folder herein denotes a set of music files in which one or more albums are collected.

To be more specific, in the sound source 10, a plurality of folders are formed as a first layer, one or more albums are formed in each folder as a second layer, and one or more Music files are recorded as sound source file in each album as a third layer.

In the internal configuration of the sound source 10 shown in FIG. 2, n folders, folders 1, 2, . . . n, are formed in a hard disk (a main folder) arranged in the sound source 10. In folder 1, albums 1*a*, 1*b*, . . . 1*m* are recorded and albums 2*a*, 2*b*, . . . 2*p* are recorded in folder 2. This same holds true with folders 3 through n. Further, music files Music-1*a*1, Music-1*a*2, . . . Music-1*ax* are recorded in album 1*a*, music files Music-1*b*1, Music-1*b*2, . . . Music-1*by* are recorded in album 1*b*, and music files Music-2*a*1, Music 2*a*2, . . . Music-2*az* are recorded in album 2*a*. The same holds true with the other albums.

It should be noted that a configuration in which folders are formed in each of the above-mentioned folders may be applied in addition to the above-mentioned configuration shown in FIG. 2.

The output unit 20 converts the signal supplied from the sound source 10 into a form which can be outputted to a speaker, an external amplifier, or a headphone for example. A speaker may be arranged on the output unit 20 to directly output the signal supplied from the sound source 10 to the outside as a sound.

The user interface 30, configured with a display block and an operator block, provides the interface through which the user understands the operation status of the audio playback apparatus 1 on the basis of the information provided on the display block and operates the audio playback apparatus 1 on the basis of the user's intention. For example, the display block shows volume level, bass and treble levels, front rear right left volume balances. On the operator block, the user can perform various input operations such as operating a power switch and changing random playback mode for example. It should be noted that the display block may be comprised of a liquid crystal display monitor and the display screen on the display block may be formed by a tablet such as a touch-sensitive pad or a touch-sensitive screen, thereby providing a configuration in which the display block and the operator block are integrated to allow the user to perform the above-mentioned input operations by simply touching the screen. Alternatively, for the operator block, a remote controller based on a jog dial may be used to provide a configuration in which the display block and the operator block are separate from each other.

The system control block 40 is based on a microcomputer. In response to signals supplied from the user interface 30, the system control block 40 execute such control operations on the sound source 10 as selective playback of music, fast-forwarding and review of music, and random playback of music which is described below. In addition, the system control block 40 executes such control operations on the output unit 20 as changing output levels and tone qualities and transmits display information to the user interface 30. Thus, the system control block 40 controls the audio playback apparatus 1 in its entirety.

The following describes the random playback operation to be executed by the system control block 40. In the above-mentioned embodiment, random playback may be executed in unit of one album or one folder in addition to one piece of music. Namely, for the unit of music files which are reproduced in one cycle, the user may choose one of one music file, one album, and one folder. Hereafter, the random playback on an album basis will be referred to as shuffle album (SHUF-A) and the random playback on a folder basis will be referred to as a shuffle folder (SHUF-F). In response to the specification entered through the user interface 30, the system control block 40 may set a SHUF-A mode for executing SHUF-A playback and a SHUF-F mode for executing SHUF-F playback in addition to the mode in which the random playback in unit of one piece of music is executed.

Figure 3:
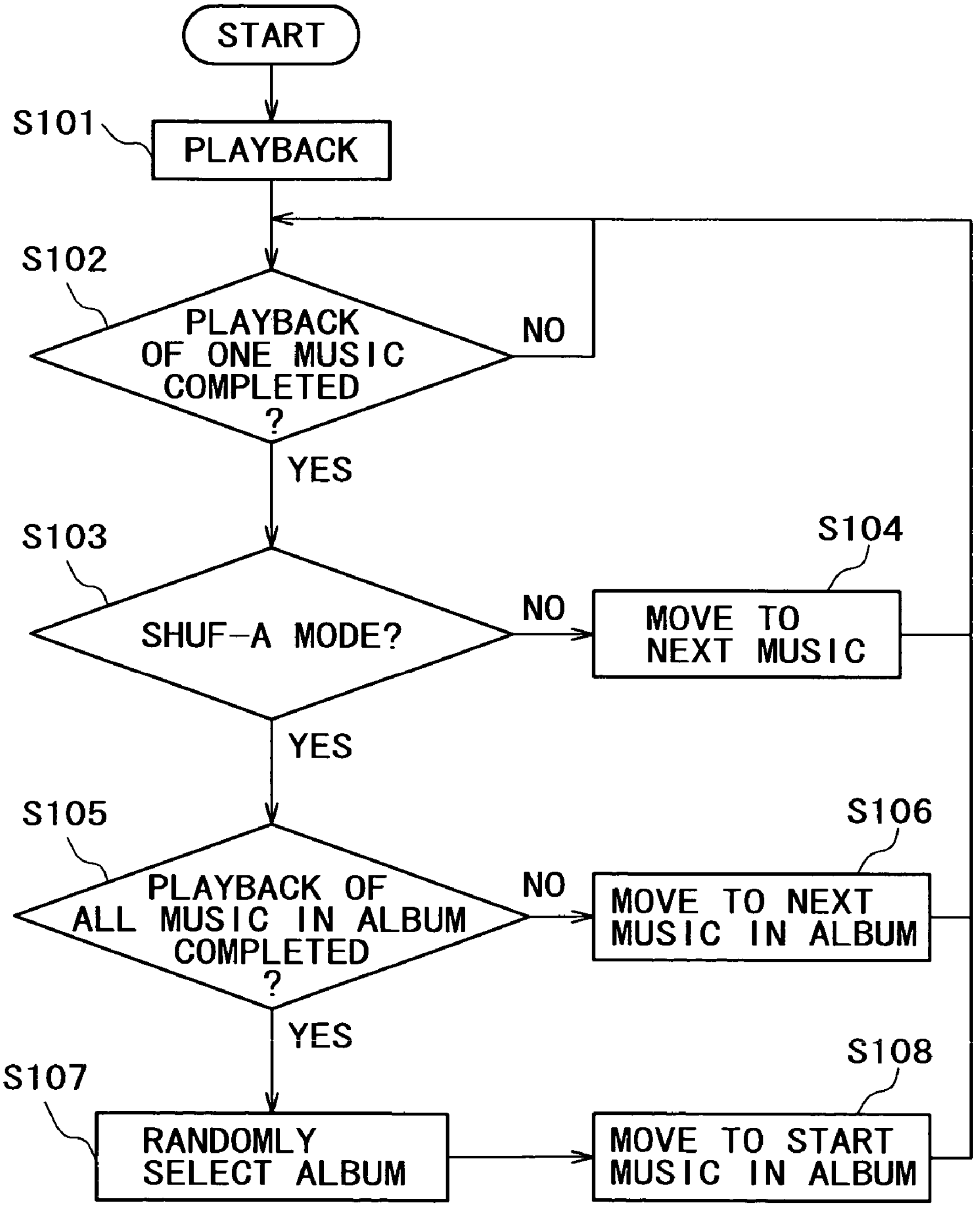
FIG. 3 is a flowchart showing of the processing flow of SHUF-A mode.
Figure 4:
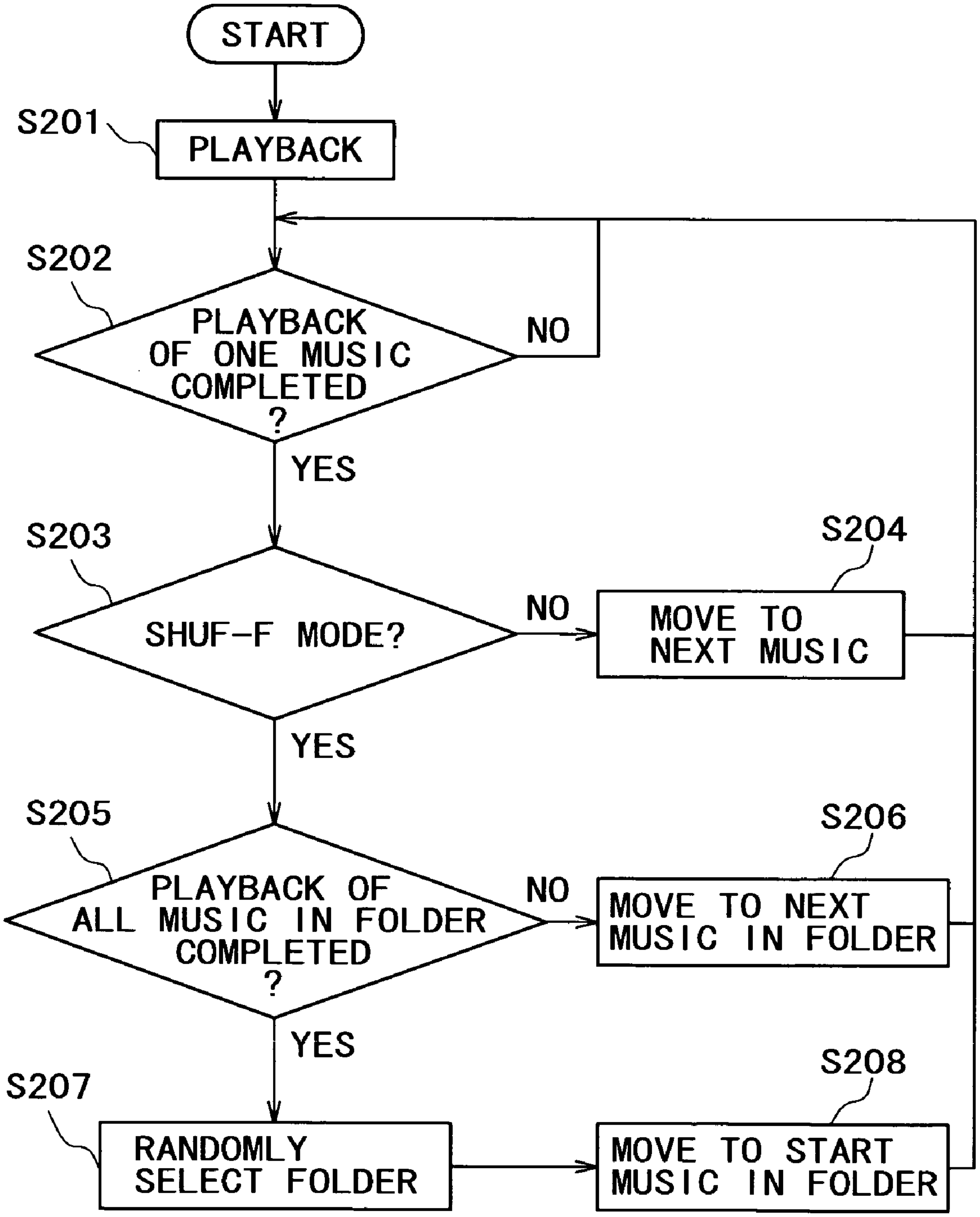
FIG. 4 is a flowchart showing of the processing flow of SHUF-F mode.

FIG. 3 shows a flowchart of a processing flow at the time when the system control block 40 executes SHUF-A playback. FIG. 4 shows a flowchart of a processing flow at the time when the system control block 40 executes SHUF-F playback. As shown in FIG. 3, in SHUF-A playback, the selected piece of music is reproduced (S101) first, a decision is made whether the playback of this piece of music has ended (S102), and if this playback is found not ended, the playback is continued. If the playback is found ended, a decision is made whether the SHUF-A mode has been specified by the user (S103). If the SHUF-A mode is found not set, normally the piece of music to be reproduced next (if all pieces of music contained in the album have been reproduced, the album to be reproduced next) is taken up (S104), upon which the procedure returns to step S101 to reproduce that piece of music.

If the SHUF-A mode is found set, then a decision is made whether all pieces of music in the album have been reproduced (S105) and, if there is any piece of music not yet reproduced in the album, the piece of music to be reproduced next is taken up (S106), upon which the procedure returns to step S101 to reproduce that piece of music.

If all pieces of music in the album have been reproduced, then an album to be reproduced is randomly selected (S107) and the piece of music to be reproduced first in the album is taken up (S108), upon which the procedure returns to step S101 to reproduce that piece of music.

It should be noted that, in the SHUF-A playback of the present embodiment, the piece of music to be reproduced next is selected in step S106 in the order of the recording in that album; it is also practicable that the inside of that album is shuffled by executing random music selection in that album and, after all pieces of music in that album have been reproduced, the next album is selected (S107).

Next, as shown in FIG. 4, in the SHUF-F playback, the piece of music currently selected is reproduced first (S201) and then a decision is made whether the playback of that piece of music has ended (S202). If the playback of that piece of music is found not ended, then the playback is continued. If the playback is found ended, a decision is made whether the SHUF-F mode is currently set by the user (S203). If the SHUF-F mode is found not set, normally the piece of music to be reproduced next is taken up (S204) (if all pieces of music in the folder have been reproduced, the next folder is taken up to and the first piece of music in that folder is taken up), upon which the procedure returns to step S204 to reproduce that piece of music.

If the SHUF-F mode is found set, a decision is made whether all pieces of music in the folder have been reproduced (S205) and, if there is any piece of music not yet reproduced, the next piece of music in that folder is taken up (S206), upon which the procedure returns to step S201 to reproduce that piece of music. If the folder has two or more albums, the playback is executed starting with the first piece of music of each of the albums arranged in a predetermined order.

When all pieces of music in the folder have been reproduced, a folder to be reproduced next is randomly selected (S207) and the first piece of music in the selected folder is taken up (S208), upon which the procedure returns to step S201 to reproduce that piece of music.

It should be noted that, in the SHUF-F playback of the present embodiment, when selecting the next piece of music in the folder in step S206, the selection is made in the order of the pieces of music recorded to that folder and, if the folder has two or more albums, the playback is executed starting with the first piece of music in each of the albums arranged in a predetermined order; it is also practicable that the inside of that folder is shuffled by executing random music selection in that folder and, after all pieces of music in that folder have been reproduced, the next folder is selected (S207).

It is also practicable that, in step S206, albums in the folder are randomly selected and the inside of that folder is shuffled on an album basis, thereby reproducing the selected albums in the order of recording and, by executing random selection inside the selected album, shuffling the inside that album for playback. Then, after all pieces of music in that folder have been reproduced, the next folder is taken up (S207).

The following describes a procedure of the selection of the random playback mode by the user. It is assumed in this procedure that a mode for the random playback in unit of one piece of music and a mode for the random playback in unit of one album (SHUF-A) be provided. The mode for random playback in unit of one piece of music is referred to as a shuffle one song mode (SHUF-1).

Figure 5A:
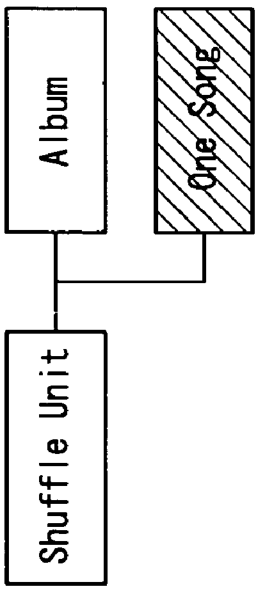
FIGS. 5A and 5B show menu screens which are displayed when the mode for reproducing music in unit of pieces of music is selected.
Figure 5B:
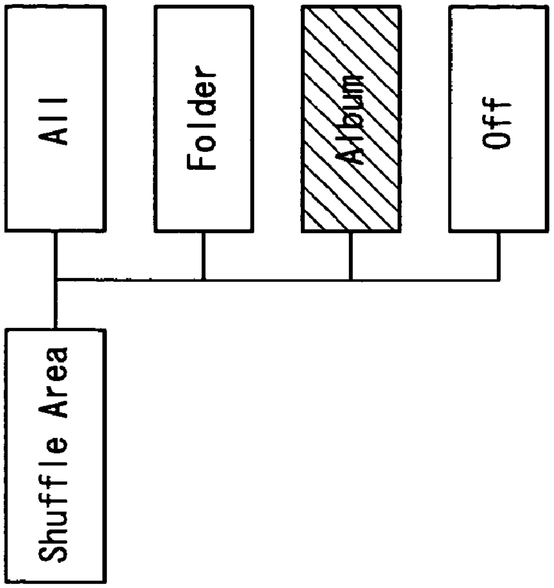

FIGS. 5A and 5B illustrate menu screens which are displayed on the user interface 30 when the SHUF-1 mode is selected. First, as shown in FIG. 5A, a menu screen for specifying the minimum shuffle unit is displayed; when the SHUF-1 mode is selected, a color change takes place in the display "One Song". In the figure, this color change is indicated by hatching (the same holds true with the following description). Next, when the minimum shuffle unit has once been specified, a menu screen for specifying a shuffle range is displayed on the display screen. FIG. 5B illustrates an example in which "Album" is selected as the shuffle range. In this case, an album is randomly selected or an album is specified by the user and one piece of music in the selected album is randomly selected for playback, which is repeated.

In FIG. 5B, "All" denotes an area in which all pieces of music recorded to the sound source 10 are subjected to random playback; "Folder" denotes an area in which the inside of a folder randomly selected or specified by user is subjected to random playback; "Album" denotes an area in which the inside of an album randomly selected or specified by the user is subjected to random playback; and "Off" denotes an area in which the random playback mode is turned off. The same holds true with the following description.

Figures 6A, 6B, 6C:
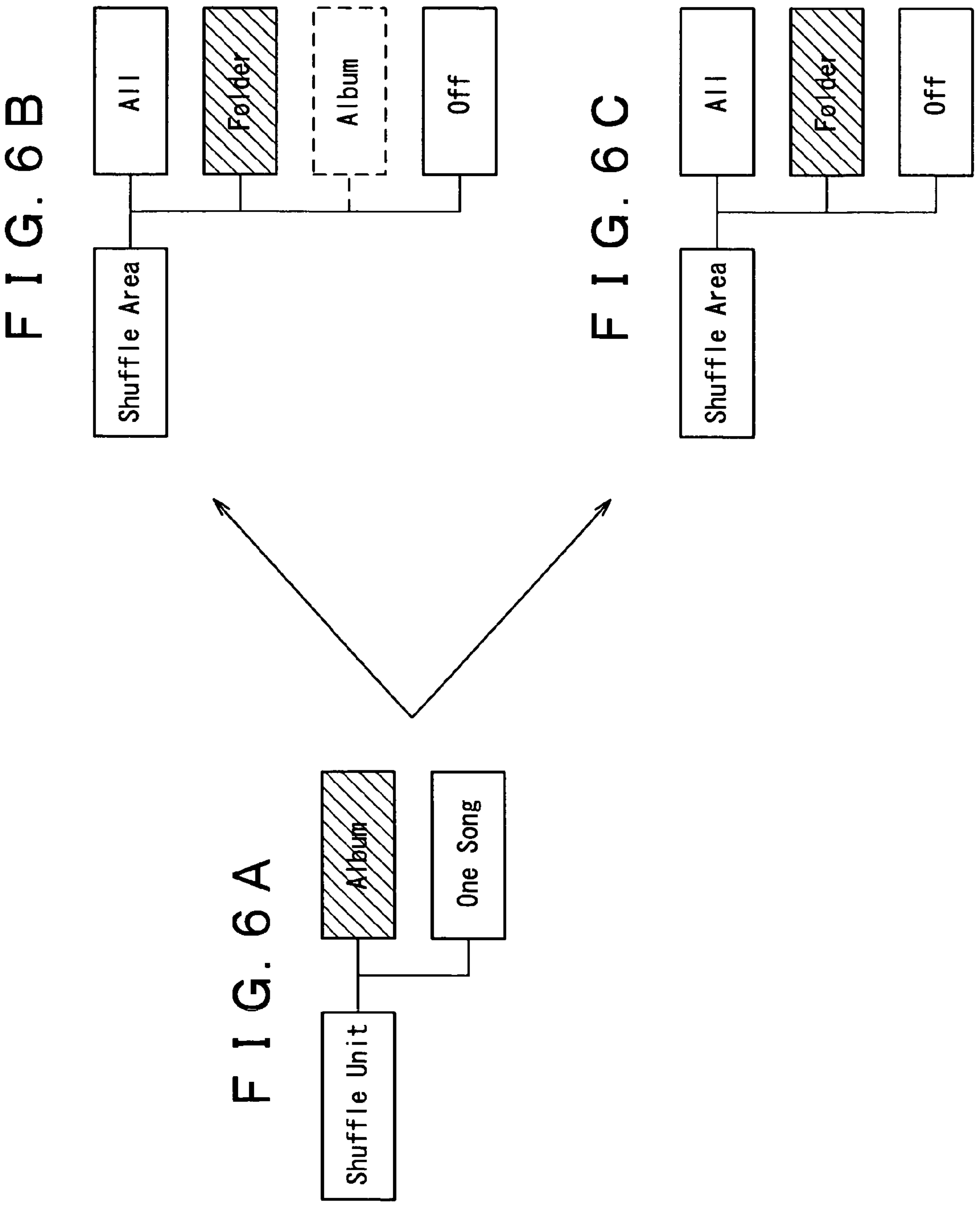
FIGS. 6A, 6B, and 6C show menu screens which are displayed when the mode for reproducing music in unit of albums is selected.

FIGS. 6A, 6B, and 6C illustrate menu screens which are displayed on the user interface 30 when the SHUF-A playback is selected. In this case, as shown in FIG. 6A, in the menu screen for specifying the minimum shuffle unit, a color change takes place in display "Album" when the SHUF-A playback is selected, on the display screen of the user interface 30. Next, a menu screen for specifying a shuffle range appears on the display screen, in which, because the SHUF-A playback is selected, it is insignificant to select "Album", so that, in order to display that "Album" cannot be selected, "Album" is displayed in a tone down manner as shown in FIG. 6B or "Album" is not displayed at all as shown in FIG. 6C. Therefore, the user comes to select one of "All", "Folder", and "Off" on the menu screen for shuffle range specification. Referring to FIGS. 6B and 6C, "Folder" is selected.

Consequently, in the above-mentioned example, a folder is randomly selected or specified by the user, then an album is randomly selected in that folder, and all pieces of music in the selected album are sequentially or randomly selected for playback. After the playback of all pieces of music in that folder, another album is randomly selected in that folder and all pieces of music in the selected album are reproduced, which is repeated.

The following describes a procedure of displaying the menu screen by the system control block 40 when specifying a shuffle range. It is assumed here that a mode for the random playback in unit of one piece of music and a mode for the random playback in unit of one album be provided in the example to be described below.

Figure 7:
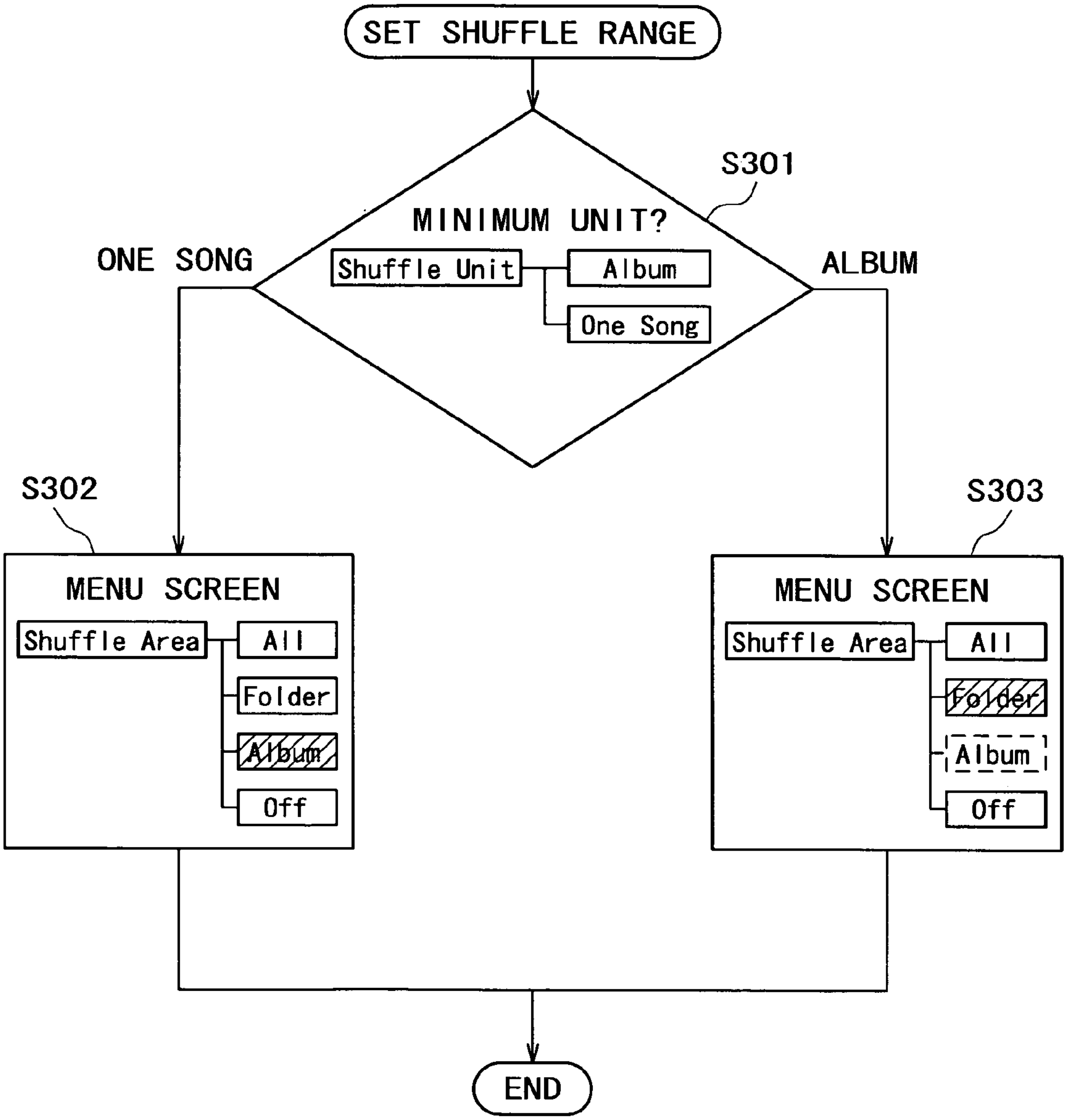
FIG. 7 is a flowchart showing of the display flow of a menu screen in which a shuffle range is specified.

FIG. 7 is a flowchart showing the flow of displaying a menu screen at the time when a shuffle range is specified. First, a menu screen for selecting the specification of the minimum shuffle unit is displayed (S301). To be more specific, first, the specification of the minimum shuffle unit is preferentially performed and one of "Album" and "One Song" is selected. Next, if "One Song", namely one piece of music, is selected, "All", "Folder", "Album", and "Off" are displayed as the screen for shuffle range specification (S302). On the other hand, if "Album", namely an album, is selected, "All", "Folder", and "Off" are displayed as the screen for shuffle range specification (S303).

Figure 8:
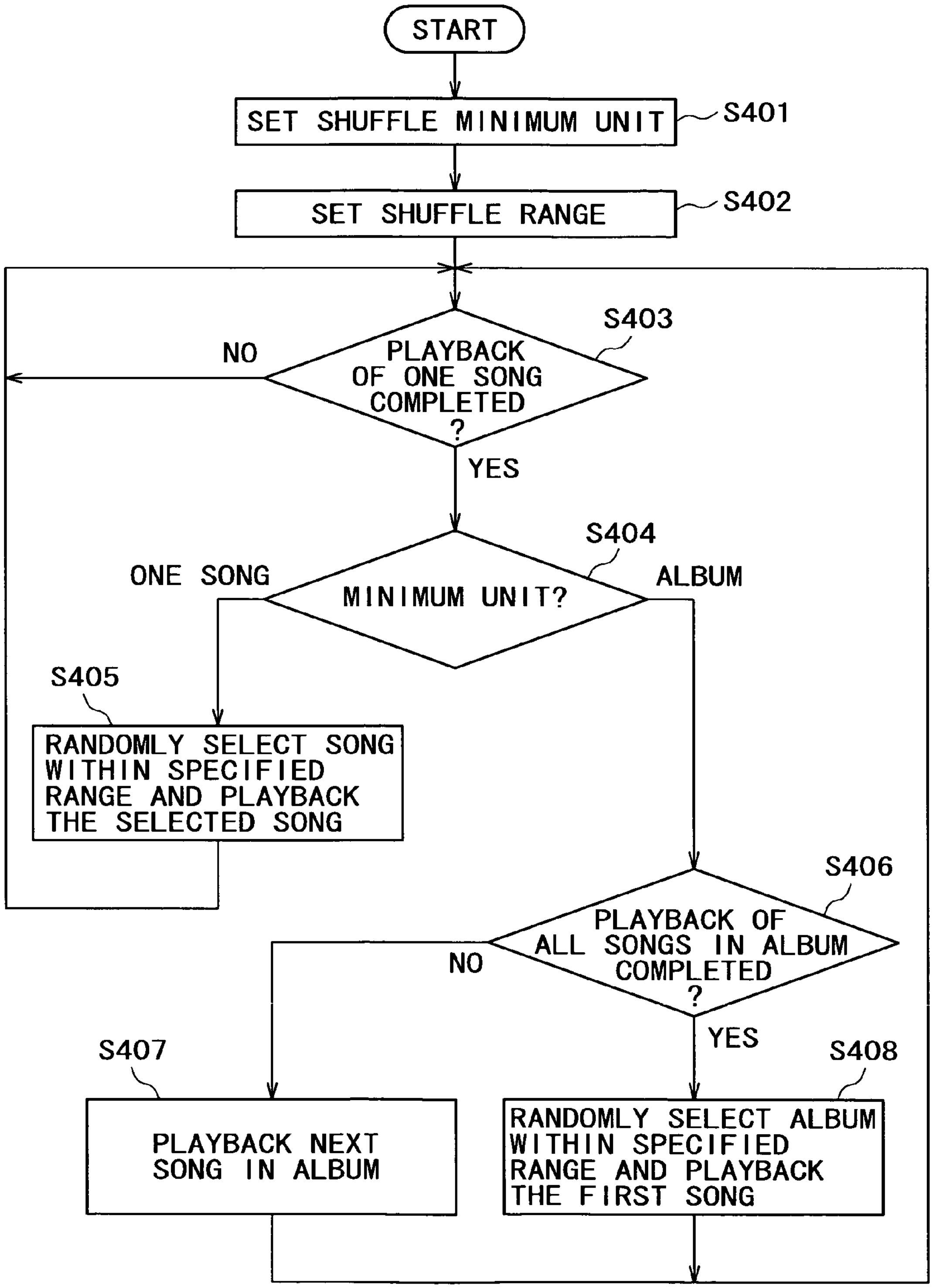
FIG. 8 is a flowchart showing of the processing flow of the selection between the random playback mode on a piece of music basis and the random playback mode on an album basis.

The following describes the random playback processing to be executed by the system control block 40 if the capability of selecting between the SHUF-1 and SHUF-A modes is provided. FIG. 8 is a flowchart showing the flow of the processing for selecting between the SHUF-1 and SHUF-A modes by the user.

As shown in FIG. 8, when the random playback mode is selected, a menu screen for specifying the minimum shuffle unit is displayed on the user interface 30 and the minimum shuffle unit is set (S401). Next, a menu screen for specifying a shuffle range according to the selected minimum shuffle unit is displayed and the shuffle range is set (S402).

Next, a decision is made whether the playback of the currently reproduced piece of music has been completed (S403); if the playback is found not completed, the playback is continued. If the playback is found completed, a decision is made whether the minimum shuffle unit specified by the user in step S401 is one piece of music or one album (S404). If the SHUF-1 mode is specified, the shuffle range specified in step S402 is determined, a piece of music is randomly selected within the specified range, and the selected piece of music is reproduced (S405).

If the SHUF-A is specified in step S404, then a decision is made whether all pieces of music in the album to which the currently reproduced piece of music belongs have been reproduced (S406). If there are found in step S406 any pieces of music not yet reproduced, these pieces of music are reproduced (S407). On the other hand, if all pieces of music in that album are found reproduced, an album is randomly selected within the shuffle range specified in step S402 and all pieces of music contained in the selected album are reproduced starting with the first piece of music (S408). Then, albums are randomly selected and reproduced until all albums within the specified range are reproduced.

It should be noted that, in the above-mentioned embodiment, a shuffle range is specified after selecting the minimum shuffle unit specification; it is also practicable that, after selecting the minimum shuffle unit specification, a shuffle range is automatically set all over the areas recorded to the sound source 10.

As described, in the present embodiment, music files to be reproduced in one cycle can be reproduced in unit of albums or folders, thereby eliminating the necessity for executing, when the user wants to listen all albums containing a piece of music listened after a long interval for example, the cumbersome operations of once canceling the random playback mode and, after the reproduction of that album, setting the random playback mode again which are inherent to the related-art technologies. In addition, the above-mentioned embodiment allows the user to select a variety of random playback modes to the user's liking.

As described and according to the invention, random playback can be executed in unit of each album or each folder.

While a preferred embodiments of the present invention have been described using specific terms, such description is for illustrative purposes only, and it is to be understood that changes and variations may be made without departing from the spirit or scope of the following claims.

What is claimed is:

1. An audio playback apparatus comprising:

a sound source storing folders, wherein at least one of the folders includes albums, and at least one of the albums includes music files, and wherein the folders, the albums, and the music files are arranged in a hierarchical manner;

playback unit specification means for specifying a shuffle unit as any one of a folder, an album, and a music file, for use in selecting music file groups;

music file group selection means for randomly selecting a music file group in accordance with the shuffle unit;

means for displaying shuffle ranges according to the specified shuffle unit;

means for receiving a selection of one of the shuffle ranges;

means for randomly selecting a next music file group from within the shuffle range; and playback means for randomly reproducing the music files included in the selected music file group before reproducing music files included in the next music file group.

2. The audio playback apparatus according to claim 1, further comprising:

album selection means for randomly selecting an album from the selected music file group, if the playback unit specification means specifies the folder;

wherein the playback means reproduces the music files for each selected album.

3. The audio playback apparatus according to claim 1, further comprising:

mode selection means for selecting a first or second reproducing mode through a user interface, wherein the first reproducing mode allows for random playback on an album basis and the second reproducing mode allows for random playback on an individual music file basis.

4. The audio playback apparatus according to claim 1, further comprising a touch screen user interface.

5. The audio playback apparatus according to claim 1, wherein the shuffle range is selected by a user, and wherein:

if the shuffle range is selected as all, then the next music file group is selected randomly from among all areas of the sound source;

if the shuffle range is selected as folder, then the next music file group is selected randomly from among a current folder of the music file group; and if the shuffle range is selected as album, then the next music file group is selected randomly from among a current album of the music file group.

6. The audio playback apparatus according to claim 1, wherein the playback means sequentially reproduces the music files included in the selected music file group in the order of their recording.

7. An audio playback method comprising the steps of:

specifying, in a sound source, a shuffle unit as any one of a folder, an album, and a music file, for use in selecting music file groups, wherein the sound source stores folders, at least one of the folders including albums, and at least one of the albums including music files, and wherein the folders, the albums, and the music files are arranged in a hierarchical manner;

randomly selecting a music file group in accordance with the shuffle unit;

displaying shuffle ranges according to the specified shuffle unit;

receiving a selection of one of the shuffle ranges;

randomly selecting, by a processor, a next music file group from within the shuffle range; and randomly reproducing the music files included in the selected music file group before reproducing music files included in the next music file group.

8. The audio playback method according to claim 7, further comprising the step of:

randomly selecting one of the albums from the selected music file group if a folder is specified in the playback unit specification step;

wherein the playback step reproduces music files for each selected album.

9. The audio playback method according to claim 7, further comprising:

selecting a first or second reproducing mode through a user interface, wherein the first reproducing mode allows for random playback on an album basis and the second reproducing mode allows for random playback on an individual music file basis.

10. The audio playback method according to claim 7, further comprising:

receiving a user input by a touch screen.

11. The audio playback method according to claim 7, wherein the shuffle range is selected by a user, and wherein:

if the shuffle range is selected as all, then the next music file group is selected randomly from among all areas of the sound source;

if the shuffle range is selected as folder, then the next music file group is selected randomly from among a current folder of the music file group; and if the shuffle range is selected as album, then the next music file group is selected randomly from among a current album of the music file group.

12. A computer readable media storing a computer program that causes a processor to perform a method, the method comprising:

specifying, in a sound source, a shuffle unit as any one of a folder, an album, and a music file, for use in selecting music file groups, wherein the sound source stores folders, at least one of the folders including albums, and at least one of the albums including music files, and wherein the folders, the albums, and the music files are arranged in a hierarchical manner;

randomly selecting a music file group in accordance with the shuffle unit;

displaying shuffle ranges according to the specified shuffle unit;

receiving a selection of one of the shuffle ranges;

randomly selecting a next music file group from within the shuffle range; and randomly reproducing the music files included in the selected music file group before reproducing music files included in the next music file group.

13. The media according to claim 12, wherein the method further comprises:

randomly selecting an album from the selected music file group if a folder is specified by said playback unit specification function;

wherein the playback function reproduces music files for each selected album.

14. An audio playback apparatus comprising:

a sound source configured to store folders, wherein at least one of the folders includes albums, and at least one of the albums includes music files, and wherein the folders, the albums, and the music files are arranged in a hierarchical manner;

a user interface configured to:

receive a user input, the user input comprising a shuffle unit as any one of a folder, an album, and a music file, for use in selecting music file groups, display shuffle ranges according to the shuffle unit, and receive a selection of one of the shuffle ranges;

a system control unit configured to randomly select a music file group in accordance with the shuffle unit, and randomly select a next music file group from within the shuffle range; and an output unit configured to randomly reproduce the music files included in the selected music file group before reproducing music files included in the next music file group.

15. An audio playback apparatus comprising:

a sound source storing folders, wherein at least one of the folders includes albums, and at least one of the albums includes music files, and wherein the folders, the albums, and the music files are arranged in a hierarchical order;

album selection means for randomly selecting one of the albums to be reproduced from the sound source;

means for displaying shuffle ranges in accordance with the album selection means;

means for receiving a selection of one of the shuffle ranges;

means for randomly selecting a next album from within the shuffle range; and playback means for randomly reproducing the music files in the selected album before reproducing music files in the next album.

16. An audio playback apparatus comprising:

a sound source storing folders, wherein at least one of the folders includes albums, and at least one of the albums includes music files, and wherein the folders, the albums, and the music files are arranged in a hierarchical manner;

folder selection means for randomly selecting one of the folders to be reproduced from the sound source;

means for displaying shuffle ranges in accordance with the folder selection means;

means for receiving a selection of one of the shuffle ranges;

means for specifying a shuffle range;

means for randomly selecting a next folder from within the shuffle range; and playback means for randomly reproducing the music files in the selected folder before reproducing music files in the next folder.

* * * * *